Sept. 10, 1968 W. FOELLER 3,400,887
DISCHARGE VALVE FOR STEAM TRAPS OR THE LIKE
Filed March 17, 1967
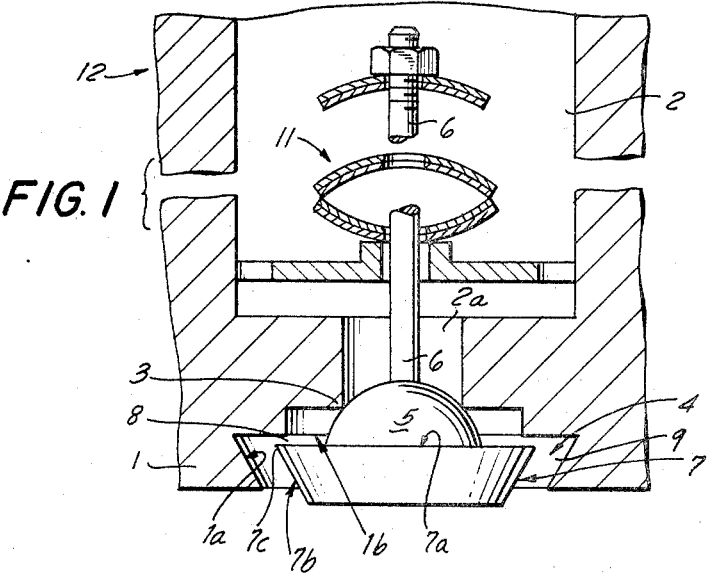
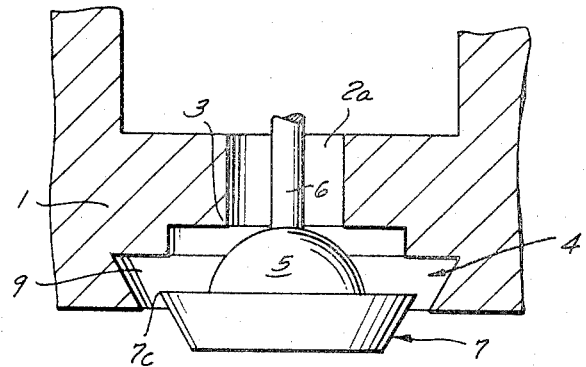
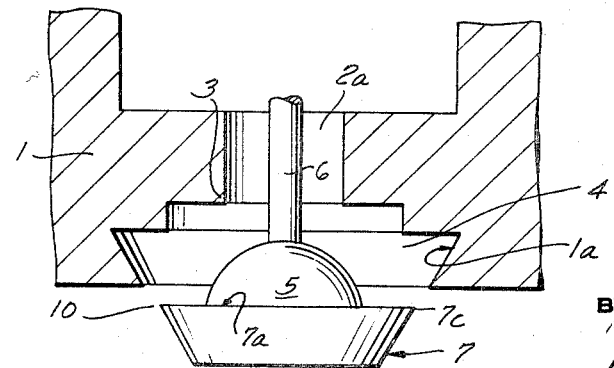
INVENTOR
WERNER FÖLLER
BY
Michael S. Striker
his ATTORNEY

United States Patent Office 3,400,887
Patented Sept. 10, 1968

3,400,887
DISCHARGE VALVE FOR STEAM TRAPS OR THE LIKE
Werner Foeller, Luxembourg, Luxembourg, assignor to Klein Schanzlin & Becker Aktiengesellschaft, Frankenthal, Pfalz, Germany
Filed Mar. 17, 1967, Ser. No. 623,881
Claims priority, application Germany, Mar. 18, 1966, K 58,761
10 Claims. (Cl. 236—59)

ABSTRACT OF THE DISCLOSURE

A discharge valve for effecting automatic evacuation of condensate from steam traps. The valve body defines a plenum chamber which collects condensate and can discharge such condensate into a channel via an annular seat which is normally closed by a first valve member connected with a bimetallic thermostat whose bias varies as a function of temperature changes in the plenum chamber. A second valve member which is movable with the first valve member defines with the valve body a series of successive flow-restricting orifices located downstream of the seat. This cross-sectional area of the second orifice first decreases and thereupon increases while the first valve member respectively moves to and beyond a position at a preselected distance from the seat. When the cross-sectional area of the second orifice decreases, the pressure of condensate upstream of the second orifice builds up and such pressure is communicated to the second valve member to effect movement of the first valve member further away from the seat.

Cross-reference to related application

A steam trap which can embody the discharge valve of the present invention is disclosed, for example, in my copending application Ser. No. 473,938, filed July 22, 1965, now Patent No. 3,353,746, issued Nov. 21, 1967, and entitled "Thermostatically controlled valve for a steam trap or the like."

Background of the invention

The present invention relates to valves in general, and more particularly to improvements in discharge valves which may be utilized to effect automatic evacuation of condensate from thermostatic steam traps, i.e., to effect evacuation of liquids which are maintained at close to steam temperature.

The discharge valve of a thermostatic steam trap must be constructed in such a way that the force produced by the thermostat at steam temperature suffices to maintain the valve in closed and sealing position. Such force must counteract fluid pressure in the trap and the head (lift) of condensate above the movable valve member of the discharge valve. It is also desirable to construct the discharge valve in such a way that it will permit evacuation of large quantities of condensate as soon as the temperature drops only slightly below steam temperature. Presently known discharge valves cannot meet all of the just outlined requirements, namely, proper closing and sealing at steam temperature and evacuation of large quantities of condensate in response to a slight drop below steam temperature. As a rule, a conventional discharge valve prevents evacuation of condensate until after the temperature of the condensate drops to a predetermined temperature at which the bias of the thermostat decreases to zero. The valve opens in response to further cooling of condensate and thermostat. The hydrodynamic forces produced by outflowing condensate in conventional discharge valves act in the same way as the forces which act upon the movable valve member due to static pressure when the valve is still closed. Therefore, the stroke of the valve member (i.e., its distance from the seat) increases linearly whenever the valve member opens. In other words, if the valve is to permit evacuation of a relatively large quantity of condensate which has accumulated in the steam trap, the condensate must be cooled to a low temperature to cool the thermostat even before the valve opens. This brings about considerable losses in steam, especially if the temperature of circulating fluid medium fluctuates at frequent intervals.

It is an important object of my present invention to provide a discharge valve which is sufficiently sensitive to open in response to small fluctuations in temperatures prevailing in the steam trap, which can effect rapid and complete evacuation of condensate as soon as such condensate accumulates in the steam trap, and which can close abruptly as soon as the evacuation of condensate is completed.

Another object of the invention is to provide a fully automatic discharge valve whose opening and closing is controlled by a thermostat and wherein a plurality of valve members cooperate with the valve body in a novel and unobvious way to insure rapid evacuation of condensate.

A further object of the invention is to provide a discharge valve wherein the hydrodynamic pressure of condensate can contribute to rapid and complete evacuation of condensate from the steam trap.

Summary of the invention

One feature of my invention resides in the provision of a discharge valve which can be used to effect evacuation of condensate from steam traps or the like. The valve comprises a valve body having an annular seat, a condensate-collecting plenum chamber at one side of the seat and a condensate-evacuating channel at the other side of the seat, first valve means provided in the channel, thermostat means arranged to bias the first valve means against the seat with a force which varies as a function of temperature changes in the plenum chamber so that the first valve means is moved away from the seat in response to fluid pressure in the chamber to thus permit entry of condensate into the channel when the temperature in the chamber decreases to a certain value, and second valve means movable with the first valve means and defining with the valve body in the channel a series of successive flow-restricting orifices including a first and a second orifice whose cross-sectional area respectively increases and decreases in response to movement of the first valve means away from the seat. The condensate which flows through the seat on movement of the first valve means away from sealing position impinges against a front surface of the second valve means to effect further movement of first valve means away from the seat. The arrangement is preferably such that the cross-sectional area of the second orifice first decreases while the first valve means moves to a position at a predetermined distance from the seat and that the cross-sectional area of the second orifice thereupon begins to increase in response to movement of the first valve means beyond such predetermined distance.

The novel features which are considered as characteristic of the invention are set forth in particular in the appended claims. The improved discharge valve itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a fragmentary axial sectional view of a discharge valve which embodies one form of my invention, the first valve means being shown in sealing position;

FIG. 2 is a similar axial sectional view of a portion of the structure illustrated in FIG. 1 but showing the first valve means in an intermediate position; and FIG. 3 illustrates the structure of FIG. 2 but with the first valve means in fully open position.

Description of the preferred embodiments

Referring first to FIG. 1, there is shown a discharge valve which is built into a thermostatic steam trap 12. The valve comprises a valve body 1 defining an annular seat 3 disposed at the lower end of the bore 2a constituting an extension of a plenum chamber 2 which collects condensate and accommodates a suitable bimetallic thermostat 11. This thermostat is operatively connected with the stem 6 of a substantially hemispherical first valve member or valve means 5 which is received in a condensate-evacuating channel 4 disposed below the seat 3. When the temperature in the chamber 2 is sufficiently high, the thermostat 11 maintains the valve member 5 in the sealing position of FIG. 1 with a force which suffices to overcome the fluid pressure in the chamber 2. The thermostat 11 is preferably placed around and biases the stem 6 upwardly.

The valve further comprises a second valve member or valve means 7 which is accommodated in the channel 4 and defines with the valve body 1 a series of successive flow restricting orifices 8 and 9. In the illustrated embodiment, the second valve member 7 constitutes an integral enlargement of the first valve member 5 and shares its movements toward and away from the seat 3. Due to a novel configuration of surfaces bounding the channel 4 and of surfaces on the second valve member 7, the cross-sectional area of the first orifice 8 will increase in response to movement of the first valve member 5 away from the seat 3 while the cross-sectional area of the second orifice 9 decreases. However, and when the first valve member 5 reaches and moves beyond a predetermined distance from the seat 3, the cross-sectional area of the second orifice 9 begins to increase because the relatively large front surface 7a of the second valve member 7 then advances beyond the outlet of a downwardly tapering lower portion of the channel 4. The valve member 5 reaches the aforementioned predetermined distance from the seat 3 when it assumes a position substantially midway between the positions shown in FIGS. 2 and 3, namely, when the front surface 7a of the second valve member 7 is flush with the lower (smaller-diameter) end of an annular internal surface 1a provided in the valve body 1 and tapering in a direction away from the seat 3. That portion of the channel 4 which is surrounded by the tapering surface 1a has an inlet which constitutes the orifice 8 and an outlet which constitutes the orifice 9. The peripheral surface 7b of the second valve member 7 tapers in the same direction as the surface 1a. When the circular edge 7c between the surfaces 7a, 7b of the second valve member 7 moves downwardly and away from an internal annular shoulder 1b of the valve body 1, the cross-sectional area of the first orifice 8 increases. At the same time, the circular edge 7c approaches the internal surface 1a to thus reduce the cross-sectional area of the second orifice 9. This will be readily understood by comparing the positions of the circular edge 7c in FIGS. 1 and 2. The numeral 10 denotes in FIG. 3 the distance between the front surface 7a and the smaller-diameter axial end of the internal surface 1a.

When the temperature in the chamber 2 drops sufficiently to reduce the bias of the thermostat 11 to such an extent that fluid pressure in extension 2a can effect movement of the first valve member 5 away from sealing engagement with the seat 3, the cross-sectional area of the orifice 8 is rather small so that this orifice throttles the flow of condensate toward the outlet of the channel 4. Thus, the orifice 8 causes the condensate to build up a pressure which is applied against the convex surface of the first valve member 5 and against the front surface 7a of the second valve member 7. The thermostat 11 yields and the valve members 5, 7 move further away from the seat 3. The fluid pressure against the front surface 7a is a function of the throttling action of the orifice 8.

As the valve members 5, 7 continue to move away from the seat 3, the throttling action of the first orifice 8 diminishes but the throttling action of the second orifice 9 increases because the circular edge 7c approaches the internal surface 1a. This is shown in FIG. 2. The pressure of outflowing condensate rises upstream of the second valve member 7 and such pressure is applied against the front surface 7a to effect further displacement of both valve members away from the seat 3. The thermostat 11 yields again and the cross-sectional area of the second orifice 9 is reduced to a minimum when the circular edge 7c is flush with the smaller-diameter end of the internal surface 1a. Further opening of the valve results in gradual reduction of fluid pressure upstream of the front surface 7a because the cross-sectional area of the orifice 9 begins to increase proportionally with increasing distance 10 (see FIG. 3) between the circular edge 7c and the surface 1a. The valve will assume such position when the thermostat is cold.

If desired, the valve of my invention may be constructed in such a way that the body 1 defines with the second valve member 7 (or with another valve member which shares movements of the valve members 5, 7) one or more additional orifices. For example, the cross-sectional area of a third orifice defined by the valve member 7 and body 1 will decrease when the circular edge 7c moves downwardly and beyond the internal surface 1a so that the condensate builds up additional pressure which causes the valve member 5 to move further away from the seat 3 in response to progressing deformation of the thermostat 11. A valve with three or more orifices can cause such build-up of condensate pressure that the pressure will reflect with greater accuracy the conditions (temperature and fluid pressure) in the chamber 2.

The operation of my discharge valve will be more satisfactory if the ratio of the area of the front surface 7a to the cross-sectional area of the opening surrounded by the seat 3 is large.

A very important advantage of my discharge valve is that the valve member 5 can open fully shortly after the thermostat 11 yields to fluid pressure in the chamber 2. Therefore, the thermostat need not be cooled to a low temperature and it can close the valve abruptly as soon as the condensate ceases to exert pressure against the surface 7a of the second valve member 7. This reduces the losses and enhances the sensitivity of the valve because the thermostat stores sufficient energy to close the valve without delay in immediate response to evacuation of condensate.

The area of the front surface 7a on the second valve member 7 and the configuration of the channel 4 are related to the mechanical spring characteristics of the thermostat 11 in such a way that, during the first stage of movement of the valve member 5 away from its seat 3 and when the temperature in the chamber 2 is only slightly below steam temperature, the hydrodynamic force of outflowing condensate first increases at a higher and thereupon at a lower rate than the bias of the thermostat 11. In other words, the pressure of condensate will increase rapidly immediately after the valve opens to effect further movement of valve member 5 away from the seat 3 against the opposition of the thermostat whose bias increases at a lower rate. In the next stage, the bias of the thermostat 11 increases more rapidly than the pressure against the front surface 7a so that the thermostat can close the valve without delay as soon as its bias can overcome the pressure of condensate against the valve members 5 and 7.

Furthermore, the area of the surface 7a and the configuration of the channel 4 can be readily selected in such a way that the hydrodynamic force of boiling condensate remains below or exceeds only slightly the bias of the thermostat 11 when the valve is in slightly open position. This insures that little steam will escape through the channel 4.

It was found that the discharge valve of my invention can permit escape of large quantities of condensate in response to very small fluctuations in temperature. For example, the valve will react immediately if the temperature (in the steam temperature range) fluctuates by 1–5° C. Also, the valve closes in immediate response to completed evacuation of condensate because the thermostat stores sufficient energy to abruptly return the valve member 5 to sealing position. Another important advantage of the valve is that it does not permit accumulation of large quantities of condensate and can respond without delay to frequent, infrequent, substantial or small changes in fluid temperature. This is believed to constitute a substantial improvement over presently known discharge valves whose operation is intermittent and which permit accumulation of large quantities of condensate in the steam trap.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A valve for effecting evacuation of condensate from steam traps or the like, comprising a body having a seat, a condensate-collecting plenum chamber at one side and a condensate-evacuating channel at the other side of said seat; first valve means provided in said channel; thermostat means arranged to bias said first valve means against said seat with a force which varies as a function of temperature changes in said chamber so that said first valve means is moved away from said seat in response to fluid pressure in said chamber to permit entry of condensate into said channel when the temperature in said chamber decreases; and second valve means comprising a rigid valve member movable with said first valve means and defining with said body in said channel downstream of said seat a series of successive flow-restricting orifices including a first and a second orifice whose cross-sectional area respectively increases and decreases in response to movement of said first valve means away from said seat.

2. A valve as defined in claim 1, wherein said valve member has a front surface against which the condensate impinges on movement of said first valve means away from said seat whereby such condensate tends to move said valve means further away from said seat.

3. A valve as defined in claim 2, wherein the cross-sectional area of said second orifice begins to increase in response to movement of said first valve means beyond a predetermined distance from said seat.

4. A valve as defined in claim 3, wherein said valve member and said body define between themselves only said first and second orifices.

5. A valve as defined in claim 2, wherein said body has an internal annular shoulder provided in said channel, said first orifice being disposed between said front surface and said shoulder and said front surface moving away from said shoulder in response to movement of said first valve means away from said seat.

6. A valve as defined in claim 1, wherein said valve member has a peripheral surface and said body has an annular internal surface bounding a portion of said channel, said second orifice being disposed between said surfaces and said peripheral surface moving nearer to said annular surface in response to movement of said first valve means away from said seat.

7. A valve as defined in claim 1, wherein said channel comprises a portion which tapers in a direction away from said seat and has an inlet and an outlet respectively constituting said first and second orifices.

8. A valve as defined in claim 7, wherein said valve member resembles a cone.

9. A valve as defined in claim 8, wherein said valve member tapers in a direction away from said seat.

10. A valve as defined in claim 9, wherein said valve member is movable beyond said outlet and wherein the cross-sectional area of said second orifice begins to increase in response to movement of said valve member beyond said outlet.

References Cited

UNITED STATES PATENTS

| | | | |
|---|---|---|---|
| 2,825,509 | 3/1958 | Pape | 236—59 |
| 3,286,925 | 11/1966 | Domm | 236—59 |
| 3,286,926 | 11/1966 | Domm | 236—59 |

WILLIAM J. WYE, *Primary Examiner.*